United States Patent [19]

Kobelt

[11] 4,060,153
[45] Nov. 29, 1977

[54] SELF-BALANCING BRAKE SHOES FOR CALIPER BRAKE

[76] Inventor: Jacob Kobelt, 6110 Oak Street, Vancouver, British Columbia, Canada, V6M 2W2

[21] Appl. No.: 723,140

[22] Filed: Sept. 14, 1976

[51] Int. Cl.² .............................................. F16D 55/26
[52] U.S. Cl. .................................... 188/72.6; 188/212
[58] Field of Search .................. 188/71.1, 72.6, 72.9, 188/212, 58, 59, 75, 76

[56] References Cited

U.S. PATENT DOCUMENTS

| 2,527,072 | 10/1950 | Pogue | 188/59 X |
|-----------|---------|---------|----------|
| 2,590,062 | 3/1952 | Bachman | 188/59 X |
| 2,856,033 | 10/1958 | McGuire | 188/59 X |
| 2,890,767 | 6/1959 | Tack | 188/59 |

FOREIGN PATENT DOCUMENTS

| 219,107 | 12/1958 | Australia | 188/59 |
|---------|---------|-----------|--------|
| 786,090 | 11/1957 | United Kingdom | 188/59 |

Primary Examiner—George E. A. Halvosa
Attorney, Agent, or Firm—Carver and Company

[57] ABSTRACT

A self-balancing structure for brake shoes in a caliper brake assembly to equalize essentially wear of brake linings. Brake assembly has frame journalling on opposite sides thereof opposed first and second arms, the arms journalling first and second brake shoes respectively. The arms cooperate with brake actuator, and member to be braked is positioned between the shoes. Self-balancing structure includes pair of balancing links, each link interconnecting a particular shoe on one side of frame with an arm on opposite side of frame so that each shoe reflects movement of opposite arm. Thus a movement towards the member by one side of the shoe is reflected by movement of essentially equal magnitude towards member by an opposite side of the other shoe. Resilient connector can be provided in balancing link to accommodate lateral movement of the member, thus permitting brake shoes to float to an extent determined by resilient connector.

10 Claims, 5 Drawing Figures

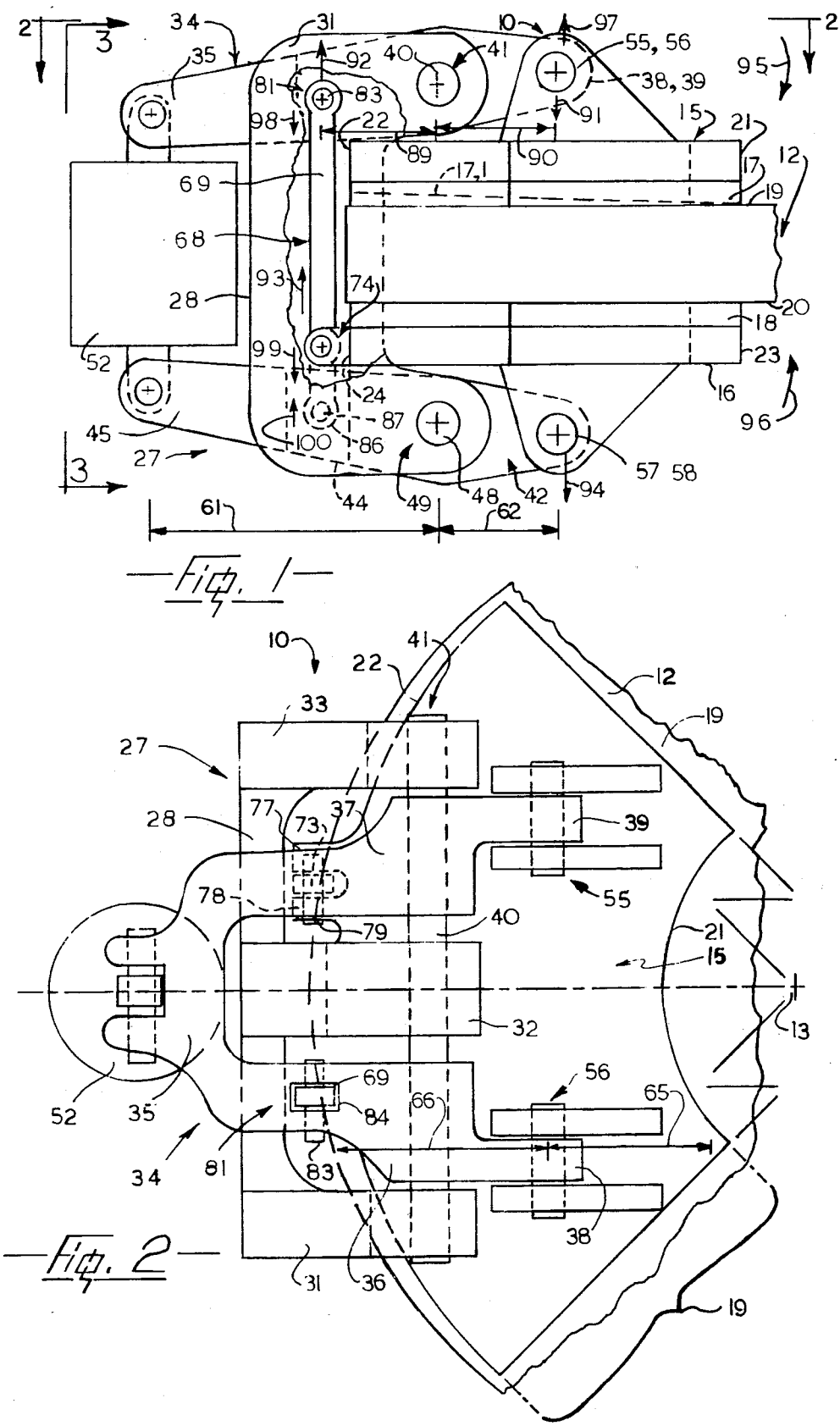

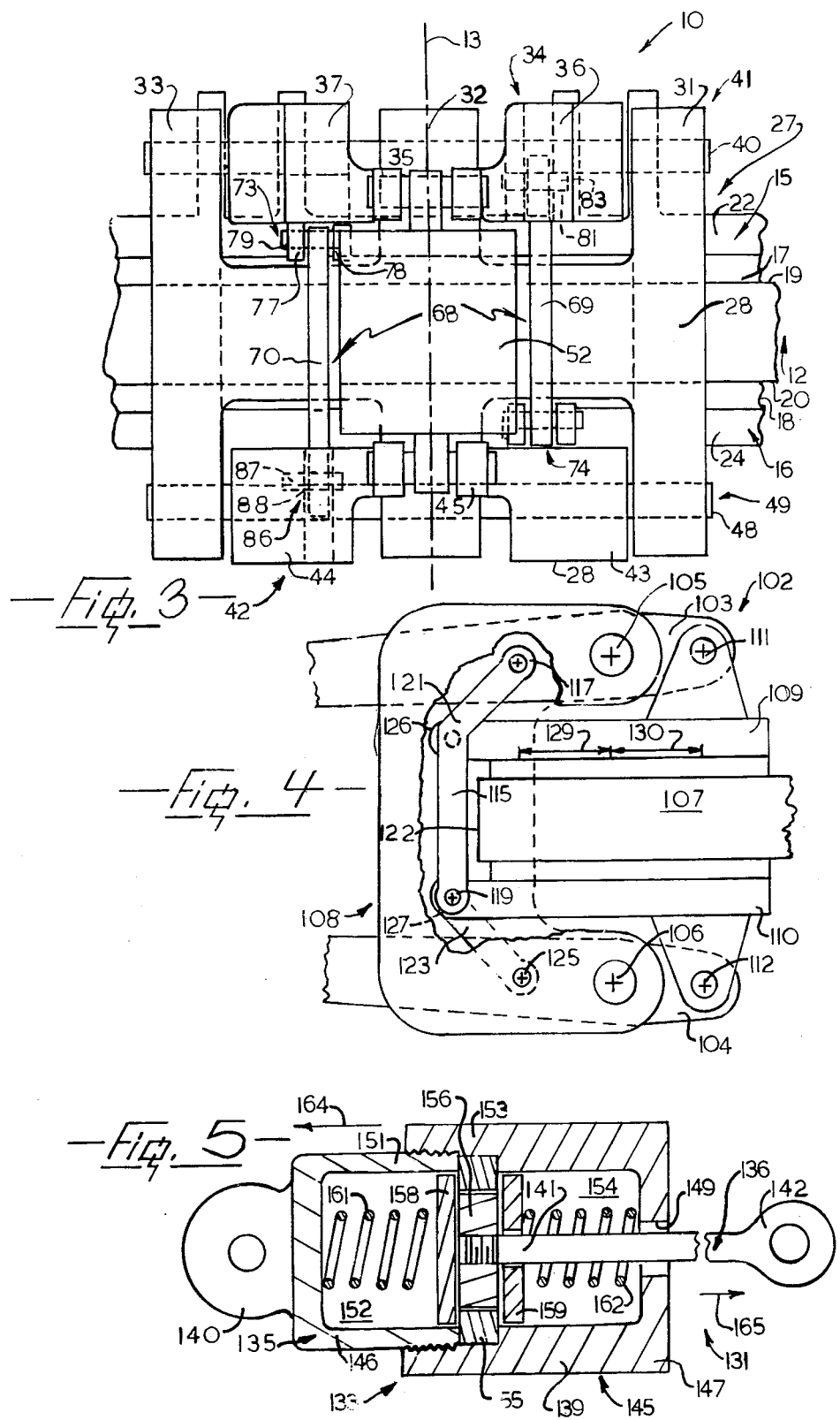

SELF-BALANCING BRAKE SHOES FOR CALIPER BRAKE

BACKGROUND OF THE INVENTION

1. Field of the Invention

The invention relates to a self-balancing means for brake shoes of caliper brakes to equalize essentially wear of brake linings, in particular for caliper brakes of disc brake assemblies designed to absorb large amounts of power.

2. Prior Art

In a caliper brake assembly for heavy-duty disc brakes, for example in logging or mining cable systems, or in heavy-duty winch systems, it is not unusual for brake linings of the brake shoes to wear unevenly, that is to wear to a greater extent adjacent one edge of the shoe when compared to the other. This results in an inwardly or outwardly tapered brake lining which, when the wear becomes excessive, requires premature lining replacement to avoid scratching the disc. Commonly, prematurely rejected worn linings which have been worn unevenly as above would have been capable of considerable additional use if the linings had worn evenly, that is if thickness of the brake linings adjacent inner and outer peripheries of the brake linings had been maintained generally equal as the shoes wear.

Theoretical analysis of brake lining wear characteristics is complex, and the rate of wear of a given lining material for a constant disc surface finish appears to depend mainly on pressure between the shoes and the disc, maximum temperature generated during brake application, and accumulated time of the brake application. One shoe and lining combination could be designed for a particular brake assembly to wear essentially evenly under one set of conditions, but when the same shoe and lining combination were used in another set of conditions, the lining could wear unevenly, thus necessitating the premature replacement as described above.

Furthermore, when the linings of a satisfactory combination of shoes and lining of a particular brake are replaced and the linings of claimed equivalent wear characteristics of a different manufacturer are substituted, it is often found that, with no other changes to the structure, rapid and uneven wear of the replacement linings results. To the inventor's knowledge, there are no devices available that ensure essentially equal wear of brake lining in all conditions irrespective of the material of the brake lining, pressure and temperature variations.

SUMMARY OF THE INVENTION

The invention reduces the difficulties and disadvantages of the prior art by providing a simple and effective balancing structure for use with existing caliper brake assemblies, so that irrespective of braking and cooling conditions are wear properties of the linings, essentially even wear of the brake linings is attainable. Furthermore, with suitable modification, such structure could also be used with a re-designed brake assembly to apply essentially equal pressure over a greater area of the shoe than presently appears possible.

The self-balancing means to equalize essentially wear of brake linings is for use in a caliper brake assembly having a frame journalling on opposite sides thereof opposed first and second arms for rotation relative to the frame. The arms journal first and second brake shoes respectively and cooperate with a brake actuator, a member to be braked being positioned between the shoes. The self-balancing means is characterized by a pair of balancing links, each link interconnecting a particular shoe on one side of the frame with an arm on the opposite side of the frame. When the links are so connected, each shoe reflects movement of the opposite arm, so that a movement towards the member by one side of one shoe is reflected by a movement of essentially equal magnitude towards the member to be braked by an opposite side of the other shoe.

A detailed disclosure following, related to the drawings, describes a preferred embodiment of the invention which is capable of expression in structure other than that particularly described and illustrated.

DESCRIPTION OF THE DRAWINGS

FIG. 1 is a simplified fragmented side elevation of a caliper brake assembly fitted with a self-balancing means according to the invention, portions of a brake disc being shown, FIG. 2 is a simplified fragmented top plan of the caliper brake assembly as seen generally from line 2—2 of FIG. 1, FIG. 3 is a simplified fragmented end elevation of the caliper brake assembly according to the invention, as seen generally from line 3—3 of FIG. 1, FIG. 4 is a fragmented side elevation, partly diagrammatic, of a caliper brake assembly fitted with an alternative balancing link, FIG. 5 is a simplified fragmented section through a reslient means associated with balancing links of the invention.

DETAILED DISCLOSURE

FIGS. 1 - 3

A caliper brake assembly 10 is adapted to brake a disc 12 which rotates about a disc central axis 13 and serves as a member to be braked by the brake assembly. The assembly has a pair of opposed first and second brake shoes 15 and 16 having respective linings 17 and 18 which are forced towards each other to contact first and second braking faces 19 and 20 of the disc when the brake is actuated. The shoe 15 has inner and outer peripheries 21 and 22, and the shoe 16 has inner and outer peripheries 23 and 24, the terms "inner" and "outer" referring to portions of the shoe with respect to the central axis 13.

The assembly has a frame 27 having a base portion 28 which extends generally tangentially to the disc as seen in FIG. 2, and three generally similar, spaced and parallel U-shaped frame portions 31, 32 and 33 extending normally from the base portion to enclose an edge of the disc, general shape of the portion 31 being best seen in FIG. 1. As seen in FIGS. 2 and 3, the assembly has a first arm 34 which is bifurcated and has a central portion 35 and spaced first and second extensions 36 and 37 extending inwardly from the central portion to inner ends 38 and 39 thereof. A hinge pin 40 passes through undesignated aligned bores in the extensions 36 and 37 of the first arm 34 and the portions 31, 32 and 33 of the frame to provide a first arm journal 41 to journal the arms to complementary portions of the frame for hinging of the arm relative to the frame. As best seen in FIG. 3, the assembly has a similar second arm 42 which is bifurcated and has similar first and second extensions 43 and 44 extending from a central portion 45 and disposed so that the first and second extensions of the first arm 34 are disposed on a side of the disc 12 remote from, and directly opposite to, the first and second extensions of the second arm. A second hinge pin 48 extends through similar undesignated bores in the frame portions 31, 32 and 33 and the arms extension 43 and 44 for hinging the second arm to the frame to provide a second arm journal 49. A pneumatic cylinder 52 extends between central portions 35 and 45 of the respective arms, that is it extends between outer ends of the arms, and serves as a brake actuator.

The brake shoes 15 and 16 have pairs of similar shoe journals 55 and 56, and 57 and 58, respectively for journalling the brake shoes to the respective arms 34 and 42, the shoe journals having similar undesignated brackets and hinge pins. It can be seen that extension of the actuator rotates each arm about its respective arm journal which results in concurrent inwards movement of the brake shoes to force the shoes against the braking surfaces of the brake disc disposed therebetween.

The above description relates to a relatively conventional caliper brake assembly in which force form the cylinder 52 and moment arms 61 and 62 of the pneumatic cylinder 52 and the shoe journals 55 through 58 respectively about the arm journals 41 and 49 determine forces on the shoe journals. As previously stated, wear characteristics of conventional brake shoe linings depend generally on pressure of the shoe on the disc and temperature of the shoe and brake during actuation of the brake. Pressure on the shoe varies across the width of the shoe, i.e. radially of the peripheries, and is generally dependent on the position of the shoe journal relative to the inner and outer peripheries of the shoe. Pressure distribution across the shoe 15 is thus generally proportional to spacings 65 and 66 of the shoe journals 55 and 56 from the inner and outer peripheries 21 and 22 respectively. It can be seen that the closer the shoe journals 55 and 56 are to the inner periphery 21, the greater is the pressure at the inner periphery of the shoe and the lesser the the pressure at the outer periphery of the shoe. Thus there is a radial pressure variation across the shoe which is proportional to the ratio of the spacings 65 and 66. Wear is also proportional to a ratio of spacings of the inner and outer peripheries of the shoe from the center of the brake disc 12 but this is usually fixed by other factors and is not considered a variable. Such parameters are known in the art and are not discussed further. The invention is designed to change the above parameters by essentially equalize wear across the shoe and also to balance pressures between each shoe so that each shoe wears essentially equally.

A self-balancing means 68 according to the invention is adapted to equalize essentially wear of brake linings, and is characterized by first and second rigid balancing links 69 and 70, each link hingedly interconnecting a particular shoe on one side of a frame with an arm on the opposite side of the arm.

As best seen in FIG. 3, the first shoe 15 has a link hinge 73 and the second shoe 16 has a generally similar link hinge 74, the link hinges being positioned adjacent the outer peripheries 22 and 24 respectively of the shoes. The link hinge 73 is characterized by a pair of spaced brackets 77 and 78 extending outwardly of the outer periphery 22, the brackets having aligned bores which accept a link hinge pin 79. The first extension 36 of the first arm 34 has a link journal 81 characterized by a link journal pin 83 extending across an opening 84 in the extension 36 and supported in undesignated bores in the extension. The link journal 81 is positioned outwardly of the arm journal 41 so as to be on a side of the journal 41 remote from the shoe journals 55 and 56, as best seen in FIG. 1. The second extension 44 of the second arm 42 has a similar link journal 86 characterized by link journal pin 87 extending across an opening 88 in the extension 44 of the arm, the link journal 86 being similarly positioned relative to the respective arm journal 49. As best seen in FIG. 3, the link journal 81 on the extension 36 is disposed oppositely to the link hinge 74 on the shoe 16, and the link journal 86 on the extension 44 is disposed oppositely to the link hinge 73 on the shoe 15. The first balancing link 69 has one end journalled in the link journal 81 of the first arm and an opposite end journalled in the link hinge 74 of the second shoe. The second balancing link 70 has one end journalled on the link journal 86 of the second arm and an opposite end jorunalled on the link hinge 73 of the first shoe.

Referring to FIG. 1, the first arm journal 41 is positioned approximately midway between the link journal 81 and the shoe journals 55 and 56 so that moment arms 89 and 90 of the balancing link and the shoe about the arm journal 41 are essentially equal. The moment arm is defined as the perpendicular distance between the pivot, ie the arm journal 41, and the line of action of force from the shoe or balancing link. On the opposite side of the frame 27, the second arm journal 49 is similarly positioned generally midway between the link journal 86 and the shoe journals 57 and 58 so as to equalize moment arms similarly. Equal moment arms as above defined result in a given movement, designated by an arrow 91, of the shoe journal 55 of the shoe 15 towards the disc 12 being reflected by the essentially equal movement, designated by an arrow 92, away from the disc of the link journal 81 of that particular arm 34. The connection by the connecting link 69 between the arms and the outer periphery of the opposite shoe reflects the movement above onto the opposite shoe 16, so that the link hinge 74 of the opposite shoe 16 moves towards the disc by an equal amount designated as an arrow 93. The shoe journal 57 of the opposite shoe 16 now tends to move away from the disc as shown by an arrow 94, which, if the link journals and link hinges are all generally disposed within one plane parallel to the axis 13, results in a movement which is generally equal to that of the arrow 91. Thus the shoes start to swing laterally and are maintained generally parallel thus tending to equalize wear of the lining.

OPERATION

The operation of the caliper brake assembly follows closely that of a conventional caliper brake assembly except for reactions produced by the connecting links. Thus, extension of the brake actuator or cylinder 52 rotates the arms 34 and 42 in direction of arrows 95 and 96 respectively which forces the shoes 15 and 16 against the braking faces 19 and 20 to squeeze the disc 12 therebetween. This is similar to a conventional caliper brake and, for a set of new linings and an ideal link and hinge mechanism, forces between opposite portions of the shoes would be essentially equal. Thus, with suitable conditions the shoes would wear equally and would be maintained parallel between the inner and outer peripheries of the shoes.

However, if the lining of the shoe 15 were tapered outwardly a small amount, ie wedge shaped as shown exaggerated in broken outline 17.1, there would be an effective high spot adjacent the inner periphery 21 of the shoe producing a force on the shoe journal 55 in direction of an arrow 97 in excess of the expected corresponding force on the shoe journal 57 of the shoe 16. Because the moment arms 89 and 90 are equal, this excess force would result in an equal excess force transfered by the arm 34 to the link journal 81 in direction of an arrow 98. The connecting link 69 transmits this excess force to the link hinge 74 which tends to push the outer periphery 24 of the shoe 16 away from the disc in direction of an arrow 99. The shoe 16 tends to rock about the shoe journals 57 and 58 and its inner periphery 23 to produce an equal force in direction of the arrow 94 on the shoe journal 57 of the shoe 16. Because of the equal moment arms as aforesaid, the shoe 16 swings about the frame on the journal 49 and produces a corresponding opposite force in direction of an arrow 100 on the link journal 86, which is transmitted through the balancing link 70 to the link hinge 73 on the shoe 15. The force on the hinge 73 reacts on the shoe 15 similarly to the forces on the hinge 74 and tends to rock the shoe 15 about the journal 40 to produce a corresponding force on the inner periphery 21 of the shoe 15, which tends to increase pressure on the inner periphery 21 tending to increase wear of the high spot which caused the initial unbalanced excess force, thus tending to reduce the excess force. A similar discussion can be followed relating to even wearing of shoe linings between the opposite shoes.

The effectiveness of the invention is attributed to factors outlined in the theortical discussion above. Because the moment arms are equal on both sides of the arm and the peripheries of the shoe are spaced equally relative to their respective shoe journals, it is felt that corresponding forces are generated which cause the shoes to wear evenly. This discussion above relating to the excess force that is superimposed on normal forces during brake actuation applies equally to a high or low spots on the lining of either shoe at either the inner or outer periphery, and thus a small unbalanced force resulting from initial unevenness in the brake shoe tends to be eliminated. This results in a generally equalized wear of brake lining so that the brake lining are maintained essentially parallel thus increasing useful life of the brake shoe.

ALTERNATIVES AND EQUIVALENTS

The assembly 10 is shown with bifurcated arms 34 and 42 which divide at the central portions thereof into two spaced extensions for each arm. This has application in relatively large brake assemblies, but the advantages of the invention could be obtained for smaller brake assemblies in which the arms are not bifurcated but are journalled on the frame at one location only. In both the larger and smaller assemblies, the balancing links are preferably disposed closely adjacent centers of the brake shoes to reduce a twisting tendency on the shoes. For large shoes, two sets of links may be needed.

In the structure of FIGS. 1 through 3, the balancing link carries relatively low forces, for example the balancing link can be designed to carry about ten percent of the total normal force applied to the shoe by the arm acting through the shoe journal. If the balancing link were made more substantial and the link and shoe journals were strengthened and repositioned, whilst still maintaining the moment arms 89 and 90 equal, a greater proportion of force can be applied to the shoe through the balancing links. It is considered that, with suitable positioning of the various journals and hinges, up to about fifty percent of the total force applied to the shoe could be applied through the balancing link adjacent the outer periphery of the shoe, with the balance of the force being applied adjacent the inner periphery of the shoe through the shoe journal. This would likely require positioning of the shoe journal more closely to the inner periphery of the shoe than shown. This has particular advantage in relatively wide shoes where spacing between the inner and outer peripheries of the shoe is excessive and pressure variations across the shoe might otherwise introduce difficulties.

FIG. 4

An alternative caliper brake assembly 102 is shown simplified and diagrammatic and has opposed first and second arms 103 and 104 journalled on respective first and second arm journals 105 and 106 respectively on opposite sides of a frame 108 to enclose a periphery of a disc 107. First and second brake shoes 109 and 110 are journalled on respective shoe journals 111 and 112 so that the disc is sandwiched between the brake shoes. A brake actuator (not shown) cooperates with the arms to force the shoes together to brake the disc therebetween. A first balancing link 115 extends between a link journal 117 on the first arm 103 and a link hinge 119 on the second shoe 110. The balancing link 115 is cranked at 121 to avoid interference with the disc because the link journal 117 is positioned inwardly of an outer periphery 122 of the disc. Similarly to the first embodiment, the first arm journal 105 is positioned midway between the link journal 117 and the link hinge 119 so that moment arms 129 and 130 about the arm journal of the balancing link and the shoe journal are equal. A similar second balancing link 123, a portion of which is shown in broken outline, is similarly connected to a link journal 125 on the second arm 104 and to a link hinge 126 on the first shoe. The balancing link 123 is similarly cranked at 127 to avoid interference with the disc and similarly moment arms of the link 123 and shoe 110 about the arm journal 106 are equal.

A cranked balancing link has an advantage that it increases range of positioning of the shoe and arm journals relative to the actuator and disc so as to facilitate selection of particular forces between the balancing link and the shoe journal. With a cranked link, the link journals can be positioned inwardly of the outer peripheries of the shoes or discs as shown.

FIG. 5

An alternative balancing link 131 has a resilient means 133 to provide limited elasticity in the link which has particular application in brake assemblies in which the disc or member to be braked is subject to limited lateral movement whilst being braked. Such movement is likely to occur in heavy-duty winches using a brake disc mounted on a shaft journalled so as to permit limited axial movement of the shaft usually resulting from clearance in shaft thrust bearings. The limited elasticity of the link permits floating of the shoes to a accommodate the resulting lateral movement of the disc. If the shoes could not float because of the rigid balancing links connecting the arms and opposite shoes together, breakage or deformation of the assembly or uneven wear of brake linings would likely occur.

The resilient means 133 is fitted to each balancing link of an assembly, however one link only, namely the link 131 is to be described. The link 131 has first and second link portions 135 and 136, the portion 135 having inner and outer ends 139 and 140, and the portion 136 having inner and outer ends 141 and 142. Outer ends of the link portions are connected to link journals of the respective arms and link hinges of the respective brake shoes which are not illustrated in this figure but are as disclosed in the first embodiment of FIGS. 1 through 3. The inner ends 139 and 141 of the link portions are connected together through the resilient means, which includes a spring housing 145 having a first end portion 146 secured to or integral with the first link portion, the first end portion in effect being hinged directly to either its respective link hinge or link journal, not shown. The housing 145 has a second end portion 147 having a clearance opening 149 to accept the second link portion 136 so as to be axially aligned with first link portion 135 as shown. The first and second end portions of the spring housing include a male portion 151 having a recess 152 and a female portion 153 having a similar opposite recess 154. The male portion is threaded into the female portion which has the clearance opening 149 at an opposite end. A ring 155 is retained between the male and female portions so that the recesses 152 and 154 are disposed on opposite sides of the ring. The inner end 141 of the portion 136 carries a head means 156 which is disposed within the spring housing so as to be slidable through the ring 155. Washers 158 and 159 are positioned within the recesses 152 and 153 respectively on opposite sides of the ring 155 so as to sandwich the head means therebetween. First and second compression coil spring means 161 and 162 are fitted in the recesses 152 and 154 respectively so as to force the washers against opposite faces of the ring. It can be seen that if a sufficiently high compressive force were applied to the link 131, resistance from the spring 161 is overcome so that the head means moves in direction of arrow 164. Conversely, if a sufficiently high tensile force were applied to the link, the spring 162 would compress and the head member would move in an opposite direction, ie per arrow 165. Movement of the head means with its respective washer is limited when adjacent coils of the fully compressed coil spring interfere with each other, thus serving as stop means to limit the amount of extension or retraction of the balancing link. Alternative stop means can be substituted.

The resilient means thus includes first and second spring means fitted within the spring housing so that first spring means extends between the first end portion of the housing and the head means, and the second spring means extends between the second end portion of the housing and the head means so that the head means is sandwiched between the first and second spring means. Thus when the disc being braked moves laterally a small amount, thus causing the brake shoes to move laterally, the balancing links are subjected to tensile or compressive forces and one of the spring means in each is compressed to permit the limited relative axial movement between the first and second link portions, thus permitting the brake shoes to float to follow the lateral movement of the member being braked.

I claim:

1. In a caliper brake assembly having a frame journalling on opposite sides thereof opposed first and second arms for rotation relative to the frame, the arms journalling first and second brake shoes respectively and cooperating with a brake actuator, a member to be braked being positioned between the shoes, a self-balancing means to equalize essentially wear of brake linings being characterized by:
    a. a pair of balancing links, each link hingedly interconnecting a particular shoe on one side of the frame with an arm on the opposite side of the frame,
so that each shoe reflects movement of the opposite arm, so that a movement towards the member by one side of one shoe is reflected by a movement of essentially equal magnitude towards the member by an opposite side of the other shoe.

2. A self-balancing means for a caliper brake assembly as claimed in claim 1 in which:
    a. the brake shoes have inner and outer peripheries referred to with respect to the member being braked.
    b. each brake shoe has a shoe journal for journalling the brake shoe to the respective arm,
    c. each arm has an arm journal to journal a respective arm to the frame, the arm journal in each arm being positioned outwardly of the shoe journal of each shoe,
and in which the self-balancing means is further characterized by:
    d. each arm having a link journal positioned outwardly of the arm journal so as to be on a side of the arm journal remote from the shoe journal, each link journal journalling one end of a respective balancing link, the arm journal being positioned generally midway between the link journal and the shoe journal so that moment arms of the balancing link and the shoe journal about the arm journal are essentially equal so that movement of the shoe journal of a particular shoe towards the member is reflected by a movement of essentially equal magnitude of the link journal of that arm away from the member.

3. A self-balancing means for a caliper brake assembly as claimed in claim 2 in which:
    a. the actuator extends between oppositely disposed outer ends of the arms so as to be disposed outwardly of the balancing link.

4. A self-balancing means for a caliper brake assembly as claimed in claim 2 in which:
    a. each arm is bifurcated and has a central portion and spaced first and second extensions extending inwardly from the central portion, the first and second extensions of the first arm being disposed on a side of the member remote from and directly opposite to, the first and second extensions of the second arm,
and in which the self-balancing means is further characterized by:
    b. a first balancing link extending from a first link journal on the first extension of the first arm to a link hinge on the second shoe disposed oppositely to the first link journal, and a second balancing link extending from a second link journal on the second extension of the second arm to a link hinge on the first shoe disposed oppositely to the second link journal.

5. A self-balancing means for a caliper brake assembly as claimed in claim 4 in which:
    a. the actuator extends between the central portions of the arms.

6. A self-balancing means for a caliper brake assembly as claimed in claim 5 in which:
    a. the actuator is a double-acting pneumatic cylinder.

7. A self-balancing means for a caliper brake assembly as claimed in claim 1 in which:
   a. the balancing links are cranked to avoid interference with the member to be braked.

8. A self-balancing means for a caliper brake assembly as claimed in claim 1 in which:
   a. the balancing links have resilient means to provide limited elasticity in the links;
so as to permit limited floating of the shoes to accommodate lateral movement of the member to be braked.

9. A self-balancing means for a caliper brake assembly as claimed in claim 8 in which each balancing link is characterized by:
   a. first and second link portions having respective inner and outer ends, the link portions being connected at the outer ends thereof to the link journals of the respective arms and the link hinges of the respective brake shoes,
   b. the resilient means include:
      spring means cooperating with the inner ends of the link portions to permit relative movement between the link portions; and stop means to limit the relative movement between the link portions.

10. A self-balancing means for a caliper brake assembly as claimed in claim 9 in which each resilient means includes:
   a. spring housing having a first end portion secured to the first link portion and a second end portion having clearance to accept the inner end of the second link portion so as to be axially aligned with the first link portion,
   b. a head means fitted adjacent the inner end of the second link portion and disposed within the spring housing,
   c. first and second spring means fitted within the spring housing so that the first spring means extends between the first end portion of the housing and the head means, and the second spring means extends between the second end portion of the housing and the head means, so that the head means is sandwiched between the first and second spring means,
so that when the member being braked moves laterally causing the brake shoes to move laterally, the balancing links are subject to tension and compression forces, and the spring means compress to permit relative axial movement between the first and second link portions, thus permitting the brake shoes to float to follow lateral movement of the member being braked.

* * * * *